(12) United States Patent
Yamamoto

(10) Patent No.: US 7,263,388 B2
(45) Date of Patent: Aug. 28, 2007

(54) CHARGING SYSTEM FOR PORTABLE EQUIPMENT

(75) Inventor: Tetsuya Yamamoto, Chiba (JP)

(73) Assignee: Nokia Corporation, Espoo (FI)

( * ) Notice: Subject to any disclaimer, the term of this patent is extended or adjusted under 35 U.S.C. 154(b) by 376 days.

(21) Appl. No.: 09/894,883

(22) Filed: Jun. 29, 2001

(65) Prior Publication Data

US 2003/0003971 A1   Jan. 2, 2003

(51) Int. Cl.
  *H04M 1/00*  (2006.01)
  *H04B 1/16*  (2006.01)
  *H02J 7/00*  (2006.01)

(52) U.S. Cl. .................... 455/573; 455/343.1; 320/308

(58) Field of Classification Search ................ 455/572, 455/573, 574, 343.1, 343.2, 343.3, 343.4, 455/343.5, 550.1, 127, 571, 343.6, 575.1; 307/43; 327/530; 320/107, 108, 115, 117, 320/2, 39
See application file for complete search history.

(56) References Cited

U.S. PATENT DOCUMENTS

| | | | |
|---|---|---|---|
| 3,684,941 A | | 8/1972 | Van Acker et al. |
| 3,938,018 A | * | 2/1976 | Dahl .......................... 320/140 |
| 4,669,109 A | * | 5/1987 | Le Cheviller et al. ...... 379/143 |
| 4,743,735 A | * | 5/1988 | Abura et al. ................. 219/222 |
| 5,151,643 A | | 9/1992 | Emmert et al. |
| 5,327,065 A | * | 7/1994 | Bruni et al. ................. 320/108 |
| 5,396,538 A | * | 3/1995 | Hong .......................... 455/573 |
| 5,536,979 A | * | 7/1996 | McEachern et al. ........ 307/104 |
| 5,550,452 A | * | 8/1996 | Shirai et al. ................. 320/108 |
| 5,592,066 A | | 1/1997 | Fan |
| 5,600,225 A | | 2/1997 | Goto |
| 5,678,207 A | * | 10/1997 | Williams et al. ......... 455/569.2 |
| 5,680,028 A | * | 10/1997 | McEachern ................. 320/108 |
| 5,923,544 A | * | 7/1999 | Urano .......................... 363/22 |
| 5,931,683 A | | 8/1999 | Pinel |
| 6,028,413 A | | 2/2000 | Brockmann |
| 6,057,668 A | | 5/2000 | Chao |
| 6,831,446 B2 | * | 12/2004 | Matsuzawa ................... 322/50 |
| 7,180,265 B2 | * | 2/2007 | Naskali et al. .............. 320/108 |

FOREIGN PATENT DOCUMENTS

EP   817351  *  3/1997

* cited by examiner

*Primary Examiner*—Tilahun Gesesse
(74) *Attorney, Agent, or Firm*—Alston & Bird LLP

(57) ABSTRACT

A wall (103 in FIG. 1) is erected perpendicularly to a floor (101), and a charger body (105) in which a primary side coil (201) and a power feed portion (203) are included is mounted on the wall (103). An induction core (107) stretches in the shape of a hook from the charger body (105), and it penetrates through the primary side coil (201) inside the charger body (105). The induction core (107) can suspend a portable telephone (109) and another portable equipment (111) through charging arches (113).

8 Claims, 2 Drawing Sheets

CHARGING SYSTEM FOR PORTABLE EQUIPMENT

BACKGROUND OF THE INVENTION

1. Field of the Invention

The present invention relates to a charging system, and more particularly to a charging system for portable equipment.

2. Description of the Related Art

A portable telephone being charged by a prior-art contactless charging system based on electromagnetic induction, is shown in FIG. 3. The portable telephone 1 includes a secondary side coil 2, while a charger 3 includes a primary side coil 7. A user sets the portable telephone 1 on the charger 3 as shown in the figure and charges it for a predetermined time, period when the remaining battery capacity of the portable telephone 1 has become small, or when the portable telephone 1 is not used for a long time.

With the prior-art charging system as shown in FIG. 3, however, there is a spacing 5 between the primary side coil 7 and the secondary side coil 2, and induction cores 6 are kept apart, so that problems as mentioned below have been involved:

1. Since both the portable equipment and the charger need to include the cores made of a magnetic material such as metal, the weight and size of the portable equipment are increased.
2. Since the primary side coil and the secondary side coil are separate, even a very small deviation in the relative position between the coils exerts influence on a charging efficiency.
3. When a coin or an accessory article is accidentally held in the charger, the metal therein generates heat due to an induction current and forms a possible cause of a fire.
4. Since the charger is designed in adaptation to the geometries of the portable equipment, no charger can cope with multiple types of portable equipment.

SUMMARY OF THE INVENTION

The present invention has for its object to provide a charging system which solves the problems mentioned above, and which can cope with various types of portable equipment and can attain a stable charging efficiency.

According to the present invention, in order to accomplish the object, a charging system comprises a charging device which includes an induction core penetrating through a primary side coil, and a portable equipment which includes an insertion portion containing a secondary side coil and allowing the induction core to pass therethrough.

A charging device for a charging system includes an induction core penetrating through a primary side coil, and a portable equipment which includes an insertion portion containing a secondary side coil and allowing the induction core to pass therethrough, and comprising the primary side coil, and a power feed portion.

In addition, a portable equipment comprises an insertion portion through which an induction core of a charging device penetrates through which a primary side coil thereof is allowed to pass, and in which a secondary side coil for performing charging is contained.

Still in addition, a charging system comprises a charging device which includes a hook-shaped induction core penetrating through a primary side coil, and a portable equipment which includes a charging arch containing a secondary side coil and allowed to be suspensibly attached to the induction core.

Yet in addition, a charging device includes a hook-shaped induction core penetrating through a primary side coil, and a portable equipment which includes a charging arch containing a secondary side coil and allowed to be suspensibly attached to the induction core, and comprises a power feed portion, the primary side coil, and the hook-shaped induction core.

Further, a portable equipment comprises a charging arch which is allowed to be suspensibly attached to a hook-shaped induction core of a charging device penetrating through a primary side coil thereof and which is provided at an end part of a body of the portable equipment, and a secondary side coil which performs charging and which is contained in an annular space defined by the charging arch and a part under the arch.

Still further, a charging method for a portable equipment employing the charging system comprises installing the charging device; passing the induction core through the insertion portion; and holding the insertion portion and the induction core set for a predetermined time period.

Yet further, a charging method for a portable equipment, employing the charging system comprises fixing the charging device onto a plane perpendicular to the ground; passing the induction core through the charging arch; and holding the portable equipment suspensibly attached to the induction core for a predetermined time period.

DETAILED DESCRIPTION OF THE PREFERRED EMBODIMENTS

Now, an embodiment of the present invention will be described in detail with reference to FIGS. 1 and 2.

Figure 1:
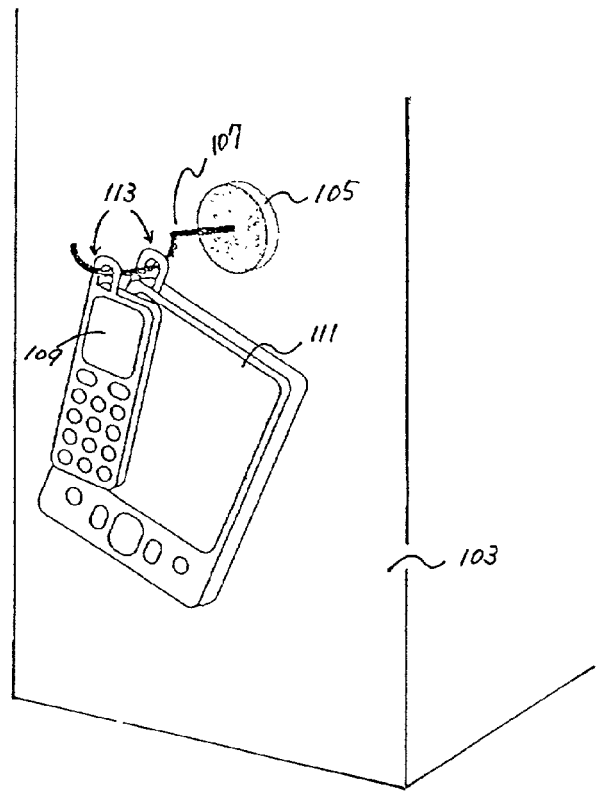
FIG. 1 is a view showing the state of the use of a charging system according to the present invention.
Figure 2:
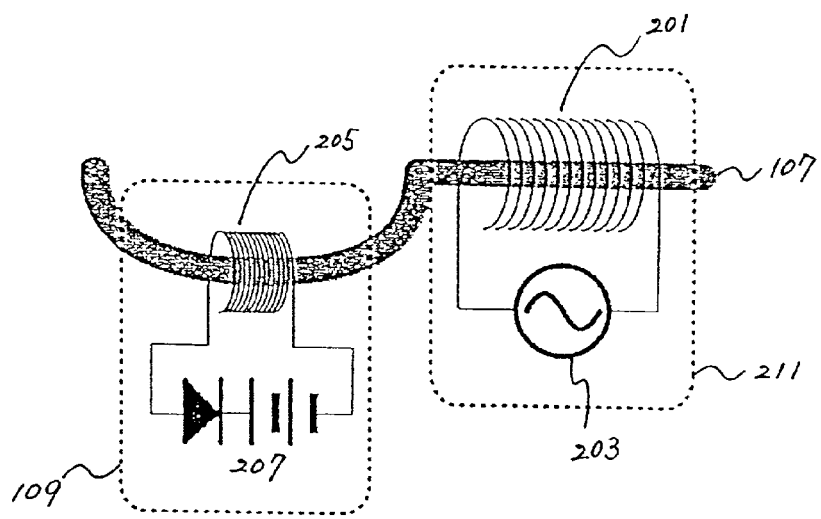
FIG. 2 is an enlarged view of the interior of the charging system according to the present invention.
Figure 3:
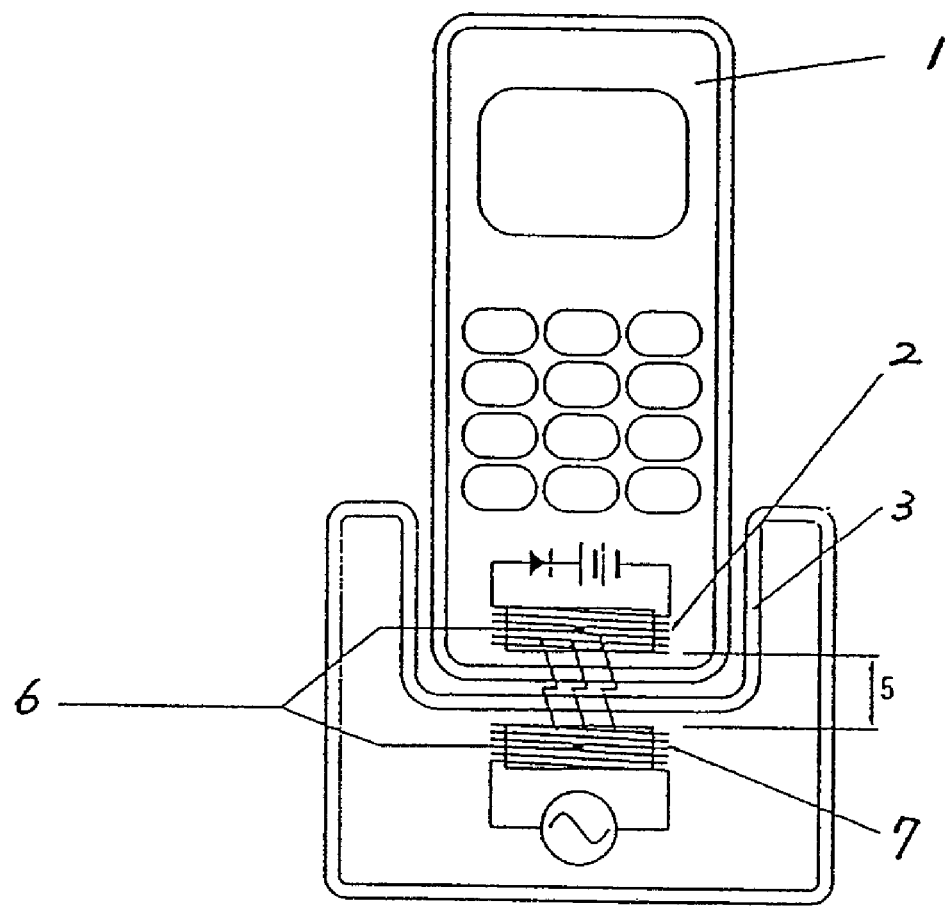
FIG. 3 is a view showing the state of the charging of a portable telephone in the prior art.

FIG. 1 is a view showing a charging system in an embodiment of the present invention as used, while FIG. 2 is an enlarged view of the interior of the charging system in the embodiment of the present invention.

As shown in FIG. 1, a wall 103 is erected perpendicularly to a floor 101 (the ground), and a charger body 105 in which a primary side coil 201 and a power feed portion 203 (shown in FIG. 2) are included is attached to the wall 103. An induction core 107 extends in the shape of a hook from the charger body 105, and penetrates through the primary side coil 201 inside the charger body 105. The induction core 107, stretching from the charger body 105, can suspend a portable telephone 109 and another portable equipment 111 through charging arches 113. Here, the charger body 105 includes a fixation member for fixing this body to the wall 103. The portable telephone 109 and the other portable equipment 111 are suspended from the induction core 107 as shown in FIG. 1 for a predetermined time period, whereby batteries built in the equipment 109 and 111 can be charged.

The interior of the portable telephone 109 in FIG. 1, as well as a charging device (211), is shown as an enlarged view in FIG. 2. A secondary side coil 205 is disposed on the side of the portable telephone 109, and it is connected with a rechargeable battery (the built-in battery) 207. The induction core 107 penetrates through the secondary side coil 205 as shown in FIG. 2. From this fact, it is understood that the secondary side coil 205 exists in an annular space which is defined by the charging arch 113 shown in FIG. 1 and a part under this arch 113.

On the other hand, a dotted line 211 indicates part of the charging device which is included inside the charger body 105 in FIG. 1. The primary side coil 201 is connected with the power feed portion 203, and the induction core 107 is mounted so as to penetrate through the primary side coil 201. When an AC voltage is applied from the power feed portion 203 in this state, a magnetic flux is generated in the induction core 107, and a voltage is induced across the secondary side coil 205 by the action of electromagnetic induction, so that the charging of the battery 207 is initiated.

While the embodiment of the present invention has been described above, advantages listed below are brought forth by the present invention:

1. The portable equipment can be made smaller in size and lighter in weight.

2. Since the induction core extends from the primary side coil over to the secondary side coil, a stable charging efficiency can be attained by hanging the portable equipment on the charging hook.

3. It is not feared that a small metal piece will accidentally enter the cradle portion of a charger, thereby to cause a fire.

4. The single charger can cope with the plurality of types of portable equipment, and can also charge a plurality of portable equipment simultaneously.

5. The charger is suited to the attachment on a wall surface, and the required space of the charging system can be saved.

6. A charging connection portion need not be provided unlike in conventional charging which employs electric contacts. Therefore, the portable equipment may be endowed with a water-proof structure, and troubles such as the corrosion of the charging connection portion can be avoided.

Incidentally, the foregoing embodiment of the present invention has been described as performing charging in which a charging arch is provided on a side of the portable equipment which is suspensibed from a hook-shaped induction core stretching from the charger body. However, charging may well be performed in such a way that a charger body is installed (or buried) within an induction core stretching perpendicularly from the ground (such as a floor), with an insertion portion containing a secondary side coil passing the induction core therethrough, whereupon both the members (the induction core and the insertion portion) are held together for a predetermined time period.

The foregoing embodiment of the present invention has been described as mounting the charger body outside the wall, but it is obvious that the charger body may well be mounted inside the wall.

In addition, the foregoing embodiment of the present invention has been described as including the primary side coil, the power feed portion and the induction core as elements of the charging device, but it is obvious that any other element may well be included in the charging device.

While the foregoing embodiment of the present invention has been described on the case of mounting the charging device on the wall in a building, the charging device may be mounted, not only in the building, but also in an automobile by way of example.

In this manner, according to the present invention, a charging system capable of coping with various sorts of portable equipment and attaining a stable charging efficiency can be provided.

What is claimed is:

1. A charging system comprising a charging device which includes a primary side coil and an induction core which penetrates through the primary side coil, and a portable equipment which includes a secondary side coil and an insertion portion including an opening and containing the secondary side coil which allows said induction core to pass therethrough in a manner to penetrate into the secondary side coil.

2. A charging method for a portable equipment employing the charging system as defined in claim 1, comprising:
   installing said charging device;
   passing said induction core through said insertion portion; and
   holding said insertion portion and said induction core together for a predetermined time period.

3. A charging device for a charging system including the charging device which includes a primary side coil and an induction core which penetrates through the primary side coil, and a portable equipment which includes a secondary side coil and an insertion portion including an opening which allows the induction core to pass therethrough in a manner to penetrate into the secondary side coil, and comprising said primary side coil, and a power feed portion.

4. A portable equipment comprising an insertion portion including an opening through which an induction core of a charging device penetrates through a primary side coil thereof, and in which a secondary side coil through which the induction core penetrates for performing charging is contained.

5. A charging system comprising a charging device which includes a primary side coil and a hook-shaped induction core which penetrates through the primary side coil, and a portable equipment which includes a secondary side coil and an opening containing a charging arch containing the secondary side coil and which allows the portable equipment to be suspensibly attached to the induction core in a manner to penetrate into the secondary side coil.

6. A charging method for a portable equipment employing the charging system as defined in claim 5, comprising:
   fixing said charging device onto a plane perpendicular to the ground;
   passing said induction core through said charging arch; and
   holding said portable equipment suspensibly attached to said induction core, for a predetermined time period.

7. A charging device for a charging system including the charging device which includes a primary side coil and a hook-shaped induction core which penetrates through the primary side coil, and a portable equipment which includes a secondary side coil and an opening containing a charging arch containing the secondary side coil and is adapted to be suspensibly attached to the induction core in a manner to penetrate into the secondary side coil, comprising a power feed portion, said primary side coil, and said hook-shaped induction core.

8. A portable equipment comprising a charging arch which is adapted to be suspensibly attached to a hook-shaped induction core of a charging device which penetrates through a primary side coil thereof and which is provided at an end part of a body of the portable equipment, and a secondary side coil which serves to perform charging and which is contained in an annular space defined by said charging arch and a part under said arch and through which the induction core penetrates.

* * * * *